2,838,528
Patented June 10, 1958

2,838,528
6-FLUORO STEROIDS AND PROCESS

J Allan Campbell, Kalamazoo Township, Kalamazoo County, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,504

15 Claims. (Cl. 260—397.3)

The present invention relates to steroid compounds and is more particularly concerned with 6-fluoroprogesterone, intermediates in the production thereof, and a process of production thereof.

The new compounds and the process of the present invention are illustratively represented by the following formulae:

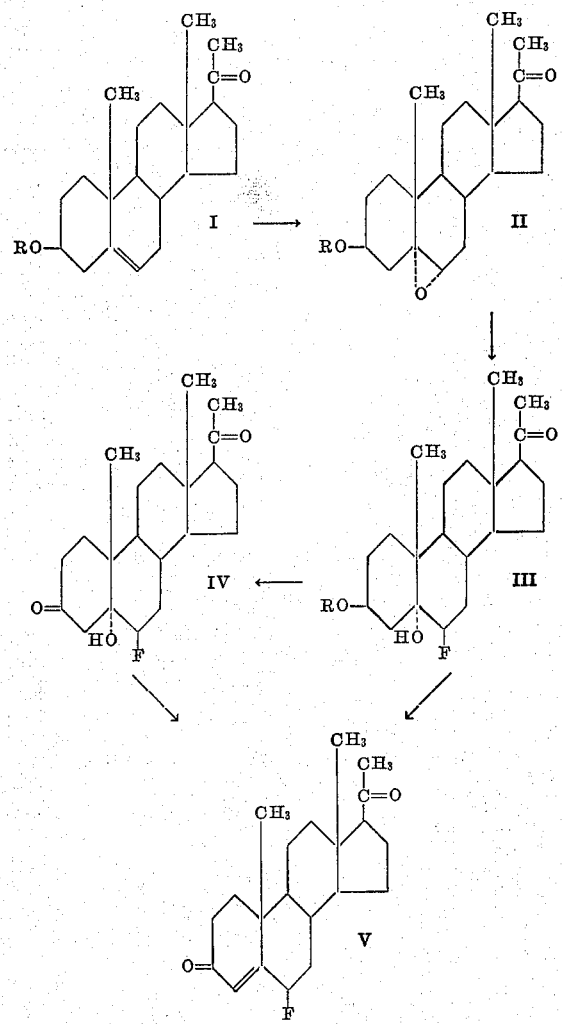

wherein R is hydrogen or the acyl radical of an organic carboxylic acid, preferably a hydrocarbon carboxylic acid containing from one to twelve carbon atoms, inclusive.

The compounds of this invention are useful as oral and parenteral progestational agents. In particular, 6α-fluoroprogesterone, owing to its potent progesterone-like effects, being about ten times as active as progesterone orally and having a good therapeutic ratio, finds application in "cyclic" therapy, where estrogenic and progestational hormones are supplied together or in succession to re-establish normal endometrium-ovary-anterior pituitary relationships in cases of menstrual disturbances.

The process of the present invention comprises: treating pregnenolone or pregnenolone acylate (I) with a peracid, such as performic, peracetic and perbenzoic to obtain 3β-hydroxy or 3β-acyloxy-5α,6α-oxidopregnan-20-one (II); treating the 3β-hydroxy or 3β-acyloxy-5α,6α-oxidopregnan-20-one (II) with hydrogen fluoride or other fluorinating agent to give the corresponding 3β,5α-dihydroxy-6β-fluoropregnan-20-one or the 3-acylate thereof (III); if the 3-acylate is used, hydrolyzing the said 3β-acyloxy-5α-hydroxy-6β-fluoropregnan-20-one under acid conditions, for example with boron trifluoride, to yield 3β,5α-dihydroxy-6β-fluoropregnan-20-one; treating the 3β,5α-dihydroxy-6β-fluoropregnan-20-one (III) with an oxidizing agent such as sodium dichromate in acetic acid to produce 5α-hydroxy - 6β - fluoropregnane - 3,20 - dione (IV), and dehydrating the thus obtained 5α-hydroxy-6β-fluoropregnane-3,20-dione (IV) with a base or, preferably, with an acid to obtain 6-fluoro-4-pregnene-3,20-dione (6-fluoroprogesterone) (V). Oxiding compound III by the Oppenauer process will produce 6-fluoroprogesterone directly.

Higher concentrations of acid in the dehydration step produce the 6α-epimer of V, while lower concentrations of acid produce the 6β-epimer. When a base is used, such as aqueous sodium or potassium hydroxide, low concentration and temperature gives 6β-fluoroprogesterone, while high concentration gives the 6α-epimer, i. e., 6α-fluoroprogesterone. The 6β-fluoroprogesterone can be converted to 6α-fluoroprogresterone by treatment with enolizing agents, such as strong mineral acids, e. g., sulfuric, perchloric, hydrochloric, nitric (dilute), or the like.

Alternatively, 6-fluoroprogesterone is produced from progesterone by ketalizing, for example with ethylene glycol in the presence of an acid such as toluenesulfonic acid, to obtain progesterone 3,20-bis-(ethylene ketal), treating the thus obtained bisketal with a peracid such as peracetic, perbenzoic and the like to obtain 5α,6α-oxidopregnane-3,20-dione 3,20-bis-(ethylene ketal), treating the thus obtained 5α,6α-oxidopregnane-3,20-dione bis-(ethylene ketal) with a fluorinating agent such as hydrogen fluoride to obtain 5α-hydroxy-6β-fluoropregnane-3,20-dione 3,20-bis-(ethylene ketal), hydrolyzing the thus obtained 5α-hydroxy-6β-fluoropregnane-3,20-dione 3,20-bis-(ethylene ketal) with an acid to obtain 5α-hydroxy-6β-fluoropregnane-3,20-dione and treating the thus produced 5α-hydroxy-6β-fluoropregnane-3,20-dione with a dehydrating agent such as a base or an acid to give 6-fluoroprogesterone.

It is an object of the present invention to provide 6-fluoroprogesterone and intermediates in the production thereof, such as 3β-hydroxy-5α,6α-oxidopregnan-20-one, 3β-acyloxy-5α,6α-oxidopregnan-20-one wherein the acyl radical is that of an organic carboxylic acid, preferably a hydrocarbon carboxylic acid containing from one to twelve carbon atoms, inclusive, 3β,5α-dihydroxy-6β-fluoropregnan-20-one, 3β-acyloxy-5α-hydroxy-6β-fluoropregnan-20-one, and 5α-hydroxy-6β-fluoropregnane-3,20-dione. Another object is the provision of processes for the production of 6-fluoroprogesterone (both the 6α- and 6β-epimers) and intermediates thereto such as 3β-hydroxy-5α,6α-oxidopregnan-20-one, 3β-acyloxy-5α,6α-oxidopregnan-20-one, 3β,5α-dihydroxy-6β-fluoropregnan-20-one, 3β-acyloxy-5α-hydroxy-6β-fluoropregnan-20-one, and 5α-hydroxy-6β-fluoropregnane-3,20-dione. A further object is to provide 6α-fluoroprogesterone and methods for the production thereof. Other objects will be apparent to those skilled in the art to which this invention pertains.

The compounds of this invention are readily adapted to incorporation in pharmaceutical compositions for oral and parenteral use. Illustrative of the preparation of a suitable oral product, three ounces of 6α-fluoroprogesterone is admixed with three pounds of lactose, U. S. P., to form a tableting composition, and the mixture processed into tablets.

An aqueous suspension for oral use, containing in each five-cubic centimeter dose two milligrams of 6α-fluoroprogesterone, is prepared from the following types and amounts of materials:

| | | |
|---|---|---|
| 6α-fluoroprogesterone, Micronized | grams | 0.4 |
| Citric acid, USP | do | 2 |
| Benzoic acid, USP | do | 1 |
| Methylparaben, USP | do | 2 |
| Propylparaben, USP | do | 0.5 |
| Glycerine, USP | cc | 150 |
| Tragacanth powder, USP | grams | 7.5 |
| Essential oil flavor concentrate | cc | 0.2 |
| Sucrose, USP | grams | 400 |
| Deionized water to make 1000 cc. | | |

The citric acid is dissolved in 500 cubic centimeters of water. The benzoic acid and parabens are added to the glycerine in a separate container, followed by the finely powdered 6α-fluoroprogesterone, tragacanth and flavors in the order named. This is mixed until a uniform suspension is achieved and then added to the aqueous solution with rapid stirring. Finally, the sugar is added and the whole mixed thoroughly followed by processing through a colloid mill. Sufficient water is employed to rinse the colloid mill and the rinsings used to bring the final volume to 1000 cubic centimeters. The suspension is assayed for potency and used clinically.

For parenteral use, microcrystalline aqueous suspensions or preferably oil solutions of 6α-fluoroprogesterone can be formulated in the usual manner.

Instead of 6α-fluoroprogesterone, the β-epimer, 6β-fluoroprogesterone, can be substituted in the above preparations in pharmaceutically equivalent amounts.

6-fluoroprogesterone is also important as an intermediate for the production of other progestationally active steroids. For example, fermentation of 6α-fluoroprogesterone with Septomyxa affinis, A. T. C. C. 6337, or, alternatively, treatment with selenium dioxide gives 6α-fluoro-1-dehydroprogesterone, a modified progestational agent. Another modified progestational agent, 6-fluoro-20-hydroxy-4-pregnen-3-one (both the α- and β-epimers), is prepared from 6-fluoroprogesterone by treating the latter with pyrrolidine in the presence of an acid catalyst to produce the 3-enamine, treating the 3-enamine with lithium aluminum hydride to give the pyrrolidyl enamine of 6-fluoro-20-hydroxy-4-pregnen-3-one, and hydrolyzing the enamine with a buffered mixture of acetic acid and aqueous sodium acetate to give 6-fluoro-20-hydroxy-4-pregnen-3-one. An advantage of 6-fluoro-20-hydroxy-4-pregnen-3-one is that the presence of the 20-hydroxy group makes possible the preparation of numerous esters which may be chosen to be oil soluble, e. g., the acetate or propionate, water soluble, for example the 20-hemisuccinate, or especially long acting, for example the 20-cyclopentylpropionate, all having progesterone-like or progestational activity. These can be made by esterifying 6-fluoro-20-hydroxy-4-pregnen-3-one in pyridine solution with acyl halides or anhydrides of organic carboxylic acids, particularly hydrocarbon carboxylic acids containing from one to twelve carbon atoms, inclusive. Representative esters thus prepared include the acetates, propionates, butyrates, isobutyrates, valerates, isovalerates, hexanoates, heptanoates, octanoates, benzoates, phenylacetates, β-cyclopentylpropionates, phenylpropionates, laurates, hemisuccinates, tartrates, maleates, toluenesulfonates, and the like, of 6-fluoro-20-hydroxy-4-pregnen-3-one.

6-fluoroprogesterone also serves as an intermediate for the production of steroids having anesthetic and related activity. For example, treating 6-fluoroprogesterone (both the α- and β-epimers) with hydrogen in the presence of a palladium catalyst gives 6-fluoropregnane-3,20-dione, a steroid having anesthetic activity.

6α-fluoroprogesterone is also important as an intermediate for the production of adrenocortically active steroids. For example, fermentation of 6α-fluoroprogesterone with Cunninghamella blakesleeana, A. T. C. C. 8688 A and B, then with Cephalophecium roseum, A. T. C. C. 8685, gives the highly adrenocortically-active, anti-inflammatory 6α-fluoro-11β,17α-dihydroxy-4-pregnene-3,20-dione. Additional step-wise fermentation of 6α-fluoro-11β,17α-dihydroxy-4-pregnene-3,20-dione with Ophiobolus herpotrichus, Centraalbureau voor Schimmelcultur, Baarn, Holland and then with Septomyxa affinis, A. T. C. C. 6737, produces the highly-active anti-inflammatory and anti-arthritic compound, 1-dehydro-6α-fluorohydrocortisone.

3β,5α-dihydroxy-6β-fluoropregnan-20-one, an intermediate in the process of the present invention, is an active progestational agent.

The starting compounds of the instant invention are pregnenolone (3β-hydroxy-5-pregnen-20-one) and pregnenolone 3-acylates. The 3-acylates are prepared from pregnenolone as shown in Examples 1 and 2 by treating the steroid in pyridine solution with the anhydride or acyl halides of organic carboxylic acids, particularly hydrocarbon carboxylic acids containing from one to twelve carbon atoms, inclusive. Representative esters thus prepared include in particular the propionate, butyrate, isobutyrate, valerate, isovalerate, hexanoate, heptanoate, octanoate, benzoate, phenylacetate, phenylpropionate, crotonate, propiolate, β-cyclopentylpropionate, tertiary butylacetate, toluate, 2-furoate, and the like, of pregnenolone.

In carrying out the process of the present invention pregnenolone or a selected pregnenolone 3-acylate is dissolved in an inert organic solvent such as chloroform, methylene chloride, ethylene dichloride, carbon tetrachloride, benzene, toluene, or the like, and treated with an organic peracid such as performic, peracetic, perpropionic, perbenzoic, monoperphthalic acid or other organic peracids. The reaction is generally carried out at low temperatures such as between minus ten and plus ten degrees centigrade. However, higher or lower temperatures such as minus thirty to up to plus forty degrees centigrade are operable.

In the preferred embodiment of the invention temperatures between zero and five degrees centigrade, a chlorinated hydrocarbon such as chloroform or methylene dichloride and peracetic, perphthalic or perbenzoic acid are used. The peracid is used in a quantity usually from ten to 500 percent of that theoretically required.

At the end of the reaction, the mixture is neutralized with a base, preferably with sodium or potassium carbonate or bicarbonate, washed with water, and the thus produced 3β-hydroxy- or acyloxy-5α,6α-oxidopregnan-20-one recovered by evaporation of the solvent. Recrystallization from organic solvents such as methanol, ethanol, Skellysolve B hexanes, heptanes, benzene, toluene, methylene chloride, ether or the like, provides pure 3β-hydroxy or 3β-acyloxy-5α,6α-oxidopregnan-20-one.

The thus obtained 3β-hydroxy-5α,6α-oxidopregnan-20-one or 3-acylate, dissolved in a suitable organic solvent, is allowed to react with hydrogen fluoride to open the epoxy bond and to give 3β,5α-dihydroxy-6β-fluoropregnan-20-one, or the 3-acylate thereof. The hydrogen fluoride used can be gaseous or liquid hydrogen fluoride under substantially anhydrous condition, hydrofluoric acid in aqueous solution or a metal fluoride releasing hydrogen fluoride such as, for instance, potassium or sodium bifluoride in a suitable solvent such as dimethylformamide, dimethyl sulfoxide, diethyleneglycol, acetic acid or propionic acid which can also contain mineral acids such as perchloric acid, sulfuric acid and the like. The reaction is ordinarily performed at temperatures from about minus seventy to plus fifty degrees centigrade. If anhydrous hydrogen fluoride is used, the lower temperatures, that is, temperatures between minus seventy and plus ten degrees, are preferred. The hydrogen fluoride, for example, can be allowed to enter from a hydrogen fluoride cylinder into a vessel not reactive to hydrogen fluoride. If aqueous hydrogen fluoride is used the reaction can be carried out between zero degrees centigrade and room temperature. Similarly, when the hydrogen fluoride is produced in situ by the reaction of a metallic fluoride such as potassium bifluoride and an acid, reaction temperatures between zero and ninety degrees centigrade are operative. At low temperatures, solvents such as chloroform, methylene chloride, and particularly tetrahydrofuran are used. In the reaction of the epoxide with potassium bifluoride and an acid, organic acids are preferred such as acetic acid, propionic acid, formic acid and the like. However, other solvents such as neopentyl alcohol, isopropanol and the like with mineral acids such as sulfuric acid, perchloric acid and the like can be used. The reaction period is usually between fifteen minutes and four hours, with reaction times of approximately two to three hours usually being sufficient for anhydrous hydrogen fluoride. When potassium bifluoride is used, reaction times of twelve hours to five days are employed. After the reaction is terminated the material is isolated by methods well known in the art such as neutralizing the excess hydrogen fluoride present with a base, for example, sodium bicarbonate, potassium bicarbonate, sodium hydroxide or the like, and extracting the product with water-immiscible solvents such as methylene chloride, chloroform, benzene, ether, hexanes and the like. Evaporation of the organic solvent used gives the crude material which is purified generally by recrystallization from organic solvents such as methanol, ethanol, acetone, Skellysolve B hexanes, benzene, methylene chloride or the like, to give pure 3β,5α-dihydroxy-6β-fluoropregnan-20-one or the 3-acylate thereof.

The thus obtained 3β-acyloxy-5α-hydroxy-6β-fluoropregnan-20-one is thereupon hydrolyzed in a water-miscible solvent, preferably in an aqueous alkanol or acetone acidic medium. As solvent alkanols, methanol and ethanol are preferred; however, other suitable water-miscible solvents such as tertiary butyl alcohol, propyl alcohol, isopropyl alcohol, dioxane, acetone, acetic acid or the like can be used. To the solution of the steroid is added an organic or inorganic acid, preferably a mineral acid such as sulfuric acid or hydrochloric acid. The time of reaction is usually from sixteen to 48 hours at room temperature, or from fifteen minutes to one hour at the boiling temperature of methanol. The reaction mixture is then neutralized with sodium bicarbonate, sodium carbonate, potassium carbonate, sodium hydroxide, or other alkali solutions, and concentrated to give a crude product consisting essentially of 3β,5α-dihydroxy-6β-fluoropregnan-20-one. The crude product can be purified using known techniques, for example, by recrystallization from organic solvents such as acetone, ethyl acetate, Skellysolve B hexanes, methanol, tertiary butyl alcohol, ether, or the like, or mixtures thereof to give pure 3β,5α-dihydroxy-6β-fluoropregnan-20-one.

The thus obtained 3β,5α-dihydroxy-6β-fluoropregnan-20-one is thereupon oxidized with an oxidizing agent such as sodium dichromate or chromium trioxide in an acid medium, such as acetic acid, to give 5α-hydroxy-6β-fluoropregnane-3,20-dione. The oxidation of the 3-hydroxyl to the 3-keto group may also be accomplished by the Oppenauer method, or by oxidation with an N-haloamide or imide, such as N-bromoacetamide.

The thus obtained 5α-hydroxy-6β-fluoropregnane-3,20-dione is then dehydrated in alkaline or acidic solution, the latter being preferred. The steroid is dissolved or suspended in solvents unreactive to the acid employed, e. g., methylene chloride, chloroform, dioxane, and carbon tetrachloride, and to the solution or suspension is added the selected acid. Acids particularly useful for this reaction are strong acids, e. g., gaseous hydrogen chloride or hydrogen bromide, sulfuric acid and the like, with gaseous hydrogen chloride preferred. For dehydration with alkali the steroid is dissolved in methanol, ethanol, dioxane, or other convenient solvents, unreactive to the base employed, preferably purged of oxygen by bubbling nitrogen through the solution, and allowed to react with an oxygen-free alkali metal base solution. Sodium or potassium hydroxide are the preferred bases, although alkali metal alkoxides, barium hydroxide, calcium hydroxide, or the like, can be used.

Depending on the amount of acid or base used, the 6α- or 6β-epimer is obtained. The dehydration produces at first the 6β-epimer which, being less stable in strong acid or bases, rearranges to the 6α-epimer. If, at the start of the dehydration reaction, the medium is strongly acidic only 6α-fluoroprogesterone is obtained. A weakly acidic or basic medium gives the 6β-fluoroprogesterone, while a strongly basic medium yields the α-epimer, i. e. 6α-fluoroprogesterone. The 6β-epimer can subsequently be converted to the 6α-epimer by treatment with an enolizing agent such as strong acid or base. The dehydration can also be accomplished using an N-bromoamide such as an N-bromoacylamide, e. g., N-bromosuccinimide, N-bromoacetamide or N-bromophthalimide.

The thus obtained 6-fluoroprogesterone is isolated from the reaction mixture and purified by conventional procedures, such as by diluting with water and either recovering by filtration or by extracting the mixture with a water-immiscible solvent such as, methylene chloride, chloroform, hexanes, benzene, ether and the like, and evaporating the solvent. The thus obtained solids are purified by conventional procedures, such as recrystallization from organic solvents, such as methanol, ethanol, Skellysolve B hexanes, ethyl acetate, benzene or the like to obtain the pure 6-fluoroprogesterone.

The following examples are illustrative of the products and the process of the present invention and are not to be construed as limiting.

EXAMPLE 1

*Pregnenolone α-oxide (3β-hydroxy-5α,6α-oxidopregnan-20-one) (II)*

A reaction mixture consisting of twenty grams of pregnenolone (3β-hydroxy-5-pregnen-20-one), four grams of anhydrous sodium acetate and twenty milliliters of forty percent peracetic acid was stirred for two hours at zero to four degrees centigrade. The reaction mixture was then washed with water and aqueous sodium bicarbonate and evaporated to near dryness. The residue thus obtained was crystallized from a mixture of methylene chloride and acetone to give 16.2 grams of pregnenolone α-oxide as plates melting at 186 to 193 degrees centigrade after softening at 184 degrees centigrade. A sample was recrystallized from methylene chloride-acetone mixture and then melted at 190 to 194 degrees centigrade and gave a rotation $[\alpha]_D$ of plus eight degrees in chloroform.

*Analysis.*—Calculated for $C_{21}H_{32}O_3$: C, 75.86; H, 9.70. Found: C, 76.19; H, 9.79.

EXAMPLE 2

*Pregnenolone α-oxide acetate (3β-acetoxy-5α,6α-oxidopregnan-20-one) (II)*

Pregnenolone acetate (3β-acetoxy-5-pregnen-20-one) was treated with peracetic acid in the same manner as described in Example 1 for pregnenolone, and gave pregnenolone α-oxide acetate which after crystallization melted at 166 to 169 degrees centigrade. The compound gave infrared absorption maxima at 1724, 1696 and 1162 centimeters$^{-1}$.

Alternatively, pregnenolone α-oxide acetate is obtained in nearly quantitative yield by treating pregnenolone α-oxide with acetic anhydride in pyridine.

Similarly, other esters of pregnenolone α-oxide are prepared by treating pregnenolone in pyridine solution with the anhydride or acyl halides of organic carboxylic acids, particularly hydrocarbon carboxylic acids containing from one to twelve carbon atoms, inclusive. Representative 3β-esters thus prepared include in particular, the propionate, butyrate, isobutyrate, valerate, isovalerate, hexanoate, heptanoate, octanoate, benzoate, phenylacetate, phenylpropionate, propiolate, crotonate, β-cyclopentylpropionate, tertiary butylacetate, toluate, 2-furoate, benzenesulfonate, toluenesulfonate, and the like of pregnenolone α-oxide.

EXAMPLE 3

6β-fluoro-3β-acetoxy-5α-hydroxypregnan-20-one (III)

In a fifty-milliliter polyethylene bottle cooled with a Dry Ice-acetone mixture was placed 6.9 grams of anhydrous hydrogen fluoride, followed by slow addition of five milliliters of chilled chloroform (stabilized with a trace of alcohol) and 13.24 milliliters of tetrahydrofuran. To this was added four grams of pregnenolone α-oxide acetate in 25 milliliters of chilled chloroform giving a violet solution which was kept for two hours at minus ten degrees centigrade, then poured into excess aqueous sodium bicarbonate with stirring. The thus obtained mixture was extracted with methylene chloride and the methylene chloride solution was washed with water and evaporated to dryness. The residue thus obtained was crystallized from methylene chloride-ethyl acetate mixture and gave three grams of 6β-fluoro-3β-acetoxy-5α-hydroxypregnan-20-one as rectangular plates softening at 213 degrees centigrade and melting at 220 to 223 degrees centigrade, unchanged on recrystallization, and having rotation $[\alpha]_D$ plus 34 degrees (chloroform).

Analysis.—Calculated for $C_{23}H_{35}FO_4$: C, 70.02; H, 8.94; F, 4.82. Found: C, 70.18; H, 9.15; F, 5.01.

Similar results were obtained using smaller amounts of hydrogen fluoride as shown in the following procedure.

A mixture of 0.60 gram of anhydrous hydrogen fluoride and 2.80 grams of pregnenolone α-oxide acetate in 24 milliliters of methylene chloride was kept four hours at room temperature, then 0.6 milliliter of pyridine was added and the mixture was evaporated to dryness. The thus obtained residue was triturated with ether to give 2.25 grams of 6β-fluoro-3β-acetoxy-5α-hydroxypregnan-20-one, softening at 212 degrees centigrade and melting at 215 to 225 degrees centigrade. Chromatography of the mother liquors gave another 0.08 gram of 6β-fluoro-3β-acetoxy-5α-hydroxypregnan-20-one.

EXAMPLE 4

6β-fluoro-3β,5α-dihydroxypregnan-20-one (III)

A mixture of 7.3 grams of anhydrous hydrogen fluoride in five milliliters of chloroform and fourteen milliliters of tetrahydrofuran was cooled in a Dry Ice-acetone bath and a solution of four grams of pregnenolone α-oxide in 25 milliliters of chloroform was added. This reaction mixture was kept at minus ten degrees centigrade for two and one-half hours and was then poured into excess aqueous sodium bicarbonate solution. The resulting mixture was extracted with methylene chloride and the methylene chloride extract washed with water and evaporated to give a solid residue, which was recrystallized from methanol-ethyl acetate mixture to give 2.05 grams of 6β-fluoro-3β,5α-dihydroxypregnan-20-one which melted at 245.5 to 250 degrees centigrade after decrepitation up to 170 degrees centigrade and sublimation at 210 degrees centigrade to hexagonal plates. Infrared absorption maxima, in Nujol suspension, were found at 3440, 3329 and 1692 centimeters$^{-1}$.

In an alternative method of preparation, a mixture of 100 milligrams of 6β-fluoro-3β-acetoxy-5α-hydroxypregnan-20-one from Example 3, 2.5 milliliters of methanol and 0.1 milliliter of boron trifluoride-etherate was heated under reflux for fifteen minutes, then was concentrated to one milliliter and diluted with water to give 75 milligrams of a precipitate consisting of crude 6β-fluoro-3β,5α-dihydroxypregnan-20-one, which after crystallization from ethyl acetate melted at 249 to 251 degrees centigrade.

EXAMPLE 5

5α-hydroxy-6β-fluoropregnane-3,20-dione (IV)

One gram of 3β,5α-dihydroxy-6β-fluoropregnan-20-one was added to 25 milliliters of acetic acid and immediately one gram of sodium dichromate dihydrate dissolved in ten milliliters of acetic acid was added while the reaction mixture was stirred and cooled in a cold water bath. The reaction mixture was allowed to stand overnight at room temperature, then two milliliters of methanol was added to destroy excess oxidant and the reaction mixture was poured into water to give 0.88 gram of 5α-hydroxy-6β-fluoropregnane-3,20-dione which sublimed at 225 degrees centigrade, softened at 241 degrees centigrade and melted at 244 degrees centigrade. This product was extremely insoluble in the usual solvents, including chloroform, ethyl acetate and dimethylformamide. An analytical sample of 5α-hydroxy-6β-fluoropregnane-3,20-dione was obtained by recrystallization from dioxane-water as hexagonal plates which softened at 273 degrees centigrade and melted at 274.5 to 275.5 degrees centigrade, with decomposition.

Analysis.—Calculated for $C_{21}H_{31}FO_3$: C, 71.98; H, 8.91; F, 5.42. Found: C, 71.80; H, 9.02; F, 5.07.

EXAMPLE 6

6β-fluoroprogesterone and 6α-fluoroprogesterone (V)

Two grams of 5α-hydroxy-6β-fluoropregnane-3,20-dione was suspended in 200 milliliters of chloroform (containing 0.75 percent alcohol) at room temperature and anhydrous hydrogen chloride gas was passed through the mixture for thirty minutes. After two minutes a pale yellow solution was obtained. Following the hydrogen chloride treatment a stream of nitrogen was passed through the solution for fifteen minutes, and the solution was then washed with cold water and with five percent aqueous sodium bicarbonate. The thus obtained chloroform solution was evaporated and gave as residue a pale glass having an ultraviolet absorption maximum, $a_M$ of 10,650 at 236 millimicrons, in alcohol solution. The crude mixture was placed on eighty grams of Florosil (synthetic magnesium silicate) and eluted with 250-milliliter fractions of acetone in petroleum ether (thirty to sixty degrees). With four to five percent acetone, 1.5 grams of a mixture of 6α- and 6β-fluoroprogesterone was obtained which on fractional crystallization from a mixture of ether and Skellysolve B hexanes gave eighteen milligrams of 6β-fluoroprogesterone having a melting point of 143 to 155 degrees centigrade, and 0.8 gram of 6α-fluoroprogesterone melting at 141 to 150 degrees centigrade and having an ultraviolet absorption maximum, $a_M$ in alcohol of 16,100 at 236 millimicrons, and infrared maxima, in chloroform solution, at 1695, 1675, 1621 and 1215 centimeters$^{-1}$.

EXAMPLE 7

6β-fluoroprogesterone

Two grams of 5α-hydroxy-6β-fluoropregnane-3,20-dione suspended in 400 milliliters of 95 percent ethanol containing nine drops of concentrated hydrochloric acid was refluxed for fifteen minutes, and one hundred milliliters of dioxane and six drops of concentrated hydrochloric acid were then added and the starting material dissolved. The solution was heated at reflux for two and one-half hours, and aliquots were taken which showed by melting points that practically no dehydration had occurred. One milliliter of concentrated hydrochloric acid was then added to the reaction mixture and refluxing was continued for an additional three and one-half hours. The mixture was then concentrated to one-half volume by evaporation under diminished pressure, diluted with 100 milliliters of water, and further concentrated until crystallization occurred, giving 0.65 gram of a mixture which on fractional crystallization from a mixture of methylene chloride and methanol gave 100 milligrams of 6β-fluoroprogesterone melting at 151 to 156 degrees centigrade. Further crystallization gave an analytical sample of 6β-fluoroprogesterone which melted at 159 to 163 degrees centigrade and had a rotation $[\alpha]_D$ in chloroform of plus 81 degrees, an ultraviolet absorption peak, $a_M$ of 12,425 at 243 millimicrons, and infrared absorption peaks at 1690 and 1676 centimeters$^{-1}$ in chloroform.

*Analysis.*—Calculated for $C_{21}H_{29}FO_2$: C, 75.87; H, 8.79; F, 5.72. Found: C, 76.03; H, 9.13; F, 5.85.

EXAMPLE 8

*6α-fluoroprogesterone from 6β-fluoroprogesterone*

A solution of 6β-fluoroprogesterone in a mixture of ethanol and aqueous hydrogen chloride was heated under reflux for thirty minutes, and the mixture was then poured into a large excess of water and the precipitated material collected by filtration and recrystallized to give 6α-fluoroprogesterone.

It is to be understood that the invention is not to be limited to the exact details of operation or exact compounds shown and described, as obvious modifications and equivalents will be apparent to one skilled in the art; the invention is therefore to be limited only by the scope of the appended claims.

We claim:
1. 6-fluoroprogesterone.
2. 6β-fluoroprogesterone.
3. 6α-fluoroprogesterone.
4. A member of the group consisting of 3β,5α-dihydroxy-6β-fluoropregnan-20-one and the 3-acylates thereof, wherein the acyl group is that of a hydrocarbon carboxylic acid containing from one to twelve carbon atoms, inclusive.
5. 3β,5α-dihydroxy-6β-fluoropregnan-20-one.
6. 3β-acetoxy-5α-hydroxy-6β-fluoropregnan-20-one.
7. 5α-hydroxy-6β-fluoropregnane-3,20-dione.
8. A process for the production of 6-fluoroprogesterone which comprises: (1) reacting a member of the group consisting of 3β-hydroxy-5α,6α-oxidopregnan-20-one and the 3-acylates thereof, wherein the acyl group is that of an organic carboxylic acid containing from one to twelve carbon atoms, inclusive, with a fluorinating agent to obtain a member of the group consisting of 3β,5α-dihydroxy-6β-fluoropregnan-20-one and the 3-acylates thereof, (2) if the 3-acylate is used, hydrolyzing the thus obtained 3β-acyloxy-5α-hydroxy-6β-fluoropregnan-20-one with an acidic reagent to obtain 3β,5α-dihydroxy-6β-fluoropregnan-20-one, (3) reacting the 3β,5α-dihydroxy-6β-fluoropregnan-20-one with an oxidizing agent to obtain 5α-hydroxy-6β-fluoropregnane-3,20-dione, and (4) reacting the thus obtained 5α-hydroxy-6β-fluoropregnane-3,20-dione with a dehydrating agent to obtain 6-fluoroprogesterone.

9. A process for the production of 6-fluoroprogesterone which comprises: (1) reacting 3β-acyloxy-5α,6α-oxidopregnan-20-one wherein the acyl group is that of an organic carboxylic acid containing from one to twelve carbon atoms, inclusive, with hydrogen fluoride to obtain 3β-acyloxy-5α-hydroxy-6β-fluoropregnan-20-one, (2) hydrolyzing the thus obtained 3β-acyloxy-5α-hydroxy-6β-fluoropregnan-20-one with an acidic reagent to obtain 3β,5α-dihydroxy-6β-fluoropregnan-20-one, (3) reacting the thus obtained 3β,5α-dihydroxy-6β-fluoropregnan-20-one with sodium dichromate in acetic acid to obtain 5α-hydroxy-6β-fluoropregnane-3,20-dione and (4) reacting the thus obtained 5α-hydroxy-6β-fluoropregnane-3,20-dione with a dehydrating agent to obtain 6-fluoroprogesterone.

10. A process for the production of 5α-hydroxy-6β-fluoropregnane-3,20-dione which comprises: reacting 3β,5α-dihydroxy-6β-fluoropregnan-20-one with an oxidizing agent.

11. A process for the production of 5α-hydroxy-6β-fluoropregnane-3,20-dione which comprises: reacting 3β,5α-dihydroxy-6β-fluoropregnan-20-one with sodium dichromate in acetic acid.

12. A process for the production of 6-fluoroprogesterone which comprises: dehydrating 5α-hydroxy-6β-fluoropregnane-3,20-dione with a member of the group consisting of acids and bases to obtain 6-fluoroprogesterone.

13. A process for the production of 6α-fluoroprogesterone which comprises: reacting 5α-hydroxy-6β-fluoropregnane-3,20-dione with hydrochloric acid to obtain 6α-fluoroprogesterone.

14. A process for the production of 6α-fluoroprogesterone which comprises: reacting 6β-fluoroprogesterone with a strong mineral acid to obtain 6α-fluoroprogesterone.

15. A process for the production of 6α-fluoroprogesterone which comprises: reacting 6β-fluoroprogesterone with hydrochloric acid to obtain 6α-fluoroprogesterone.

References Cited in the file of this patent

UNITED STATES PATENTS 2,332,815    Ruzicka _____ Oct. 26, 1943

Disclaimer 2,838,528.—*J Allan Campbell*, Kalamazoo Township, Kalamazoo County, *John C. Babcock*, Portage Township, Kalamazoo County, and *John A. Hogg*, Kalamazoo Township, Kalamazoo County, Mich. 6-FLUORO STEROIDS AND PROCESS. Patent dated June 10, 1958. Disclaimer filed May 20, 1965, by the inventors; the assignee, *The Upjohn Company*, assenting.

Hereby enter this disclaimer to claims 14 and 15 of said patent.
[*Official Gazette August 24, 1965.*]